US006713030B1

(12) United States Patent
Chandler et al.

(10) Patent No.: US 6,713,030 B1
(45) Date of Patent: Mar. 30, 2004

(54) PROCESS AND APPARATUS FOR REDUCING THE NITROGEN OXIDE CONTENT IN EXHAUST GASES BY THE CONTROLLED ADDITION OF $NH_3$

(75) Inventors: Guy Richard Chandler, Little Eversden (GB); Raj Rao Rajaram, Slough (GB); Claus Friedrich Goersmann, Herts. (GB); Valerie Anne Self, Bourne End (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/674,349

(22) PCT Filed: Apr. 20, 1999

(86) PCT No.: PCT/GB99/01205

§ 371 (c)(1),
(2), (4) Date: Sep. 14, 2001

(87) PCT Pub. No.: WO99/55446

PCT Pub. Date: Nov. 4, 1999

(30) Foreign Application Priority Data

Apr. 28, 1998 (GB) .............................................. 9808876

(51) Int. Cl.[7] .............................................. B01D 53/54
(52) U.S. Cl. ...................... 423/239.1; 60/274; 422/177; 422/211; 423/213.2
(58) Field of Search ......................... 60/274; 422/177, 422/211; 423/213.2, 235, 239.1, 239.2

(56) References Cited

U.S. PATENT DOCUMENTS

| 4,963,332 | A | | 10/1990 | Brand et al. ................. 423/235 |
|---|---|---|---|---|
| 5,369,956 | A | | 12/1994 | Daudel et al. ................. 60/276 |
| 5,482,692 | A | * | 1/1996 | Audeh et al. ............. 423/239.2 |
| 5,628,186 | A | | 5/1997 | Schmelz ....................... 60/274 |
| 5,785,937 | A | | 7/1998 | Neufert et al. ........... 423/213.2 |

FOREIGN PATENT DOCUMENTS

| EP | 0 515 857 | 12/1992 |
|---|---|---|
| EP | 0 773 354 | 5/1997 |
| GB | 2 267 365 | 12/1993 |
| JP | 07136465 | 5/1995 |
| WO | WO 96/04980 | 2/1996 |

OTHER PUBLICATIONS

International Search Report for corresponding PCT/GB99/01250, including INPADOC family printout, Search date, Aug. 4, 1999.
British Search Report for corresponding GB 9808876.8, search date Sep. 17, 1998.

* cited by examiner

Primary Examiner—Stanley S. Silverman
Assistant Examiner—Maribel Medina
(74) Attorney, Agent, or Firm—RatnerPrestia (57) ABSTRACT

In the reduction of quantities of $No_x$ in the exhaust gases of lean burn engines such as diesel engines, using a selective reduction catalyst and a source of ammonia, the present invention improves overall conversion by supplying ammonia or a precursor intermittently so that it is adsorbed and desorbed during the engine operating cycle.

14 Claims, 13 Drawing Sheets

Fig. 1. NOx and NH3 conversion on ZSM5 in dynamic conditions 0.4g ZEOLITE 2 Litres per minute and 200ppm NOx Fig. 2. TPD of NH3 from ZSM5

Fig.3. Adsorption of $NH_3$ on ZSM5 at 250°C in Full gas Mixture 0.4g ZEOLITE 2 Litres per minute and 200 ppm $NO_x$ Key: $NH_3$ Fig.4. Reaction of adsorbed $NH_3$ with $NO_2$ on ZSM5 at 150°C in Full gas Mixture 0.4g ZEOLITE 2 Litres per minute and 200 ppm $NO_x$ Key: $NO_x$ Fig.5. Effect of Pre-Adsorbed NH3 on NOx Activity of ZSM5 200ppm NO, 12%O2, 14%CO2, 200ppm CO.

Fig.6. Effect of repeated cycle on $NO_x$ Activity of ZSM5 with pre-adsorbed $NH_3$ 200 ppm NO, 12% $O_2$, 14% $CO_2$, 200 ppm CO.

Fig. 8.

Fig. 13. Cycle NO₂ Activity of ZSM5 with NH₃ injection between 325°C to 250°C
200ppm NO₂, 12%O₂, 14%CO₂, 200ppm CO, 200ppm C₃H₆, 10% H₂O, 20ppm SO₂

Fig. 15. Effect of Adsorbed $NH_3$ on $NO_x$ Activity of Cu/ZSM5 in Full gas mixture
200 ppm NO, 12% $O_2$, 14% $CO_2$, 200 ppm CO, 200 ppm $C_3H_6$, 10% $H_2O$, 20 ppm $SO_2$

PROCESS AND APPARATUS FOR REDUCING THE NITROGEN OXIDE CONTENT IN EXHAUST GASES BY THE CONTROLLED ADDITION OF NH₃

This application is the U.S. national-phase application of PCT International Application No. PCT/GB99/01205.

This invention concerns combatting air pollution from the exhaust gas of a lean burn engine. In particular, it concerns apparatus for, and a method of, reducing the content of nitrogen oxides (NOx) in such gas.

Lean burn engines (which have an air-fuel ratio greater than 14.7, generally in the range 19–50) exhibit higher fuel economy and lower hydrocarbon emissions than do stoichiometrically operated engines and are increasing in number. Emissions from diesel engines are now being regulated by legislation, and whilst it is not too difficult to meet regulations on hydrocarbon or CO emissions, it is difficult to meet regulations on NOx emissions. Since exhaust gas from lean burn engines such as diesel engines is high in oxygen content throughout the engine cycle, it is more difficult to reduce NOx to nitrogen than in the case of stoichiometrically operated engines. The difficulty is compounded by the lower gas temperature. Various approaches are being considered to reduce NOx under the oxidising conditions. One approach is that of selective catalytic reduction (SCR) with hydrocarbon, but a catalyst of sufficient activity and durability to achieve the required conversion has not been found. Another approach is to adsorb the NOx by an adsorbent when the exhaust gas is lean (ie when there is a stoichiometric excess of oxygen) and release and reduce the adsorbed NOx when the exhaust gas is rich, the exhaust gas being made rich periodically. During the lean operation, NO is oxidised to $NO_2$ which can then react readily with the adsorbent surface to form nitrate. This approach, though, is constrained at low temperature by restricted ability to form $NO_2$ and by adsorbent regeneration and at high temperature by sulphur poisoning. Most adsorbents operate in a certain temperature window and are deactivated by sulphate formation. The approach of the present invention is that of SCR of NOx by $NH_3$. This approach has been applied to static diesel engines using a $V_2O_5$—$TiO_2$ type catalyst.

Figure 1:
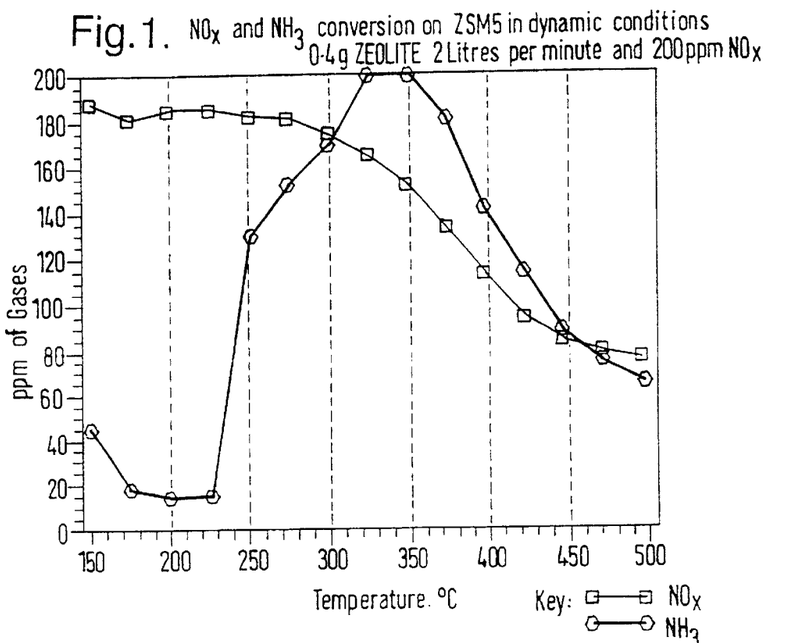
FIG. 1 shows NOx and $NH_3$ concentrations in simulated exhaust gas against temperature after treatment by zeolite ZSM5, the $NH_3$ being supplied continuously.

The application of $NH_3$ SCR technology to the control of NOx emission from lean burn vehicles, however, requires a suitable $NH_3$ supply strategy, especially at low temperature, for various reasons. The engine-out NOx varies with temperature, so the amount of $NH_3$ supplied must be well controlled as a function of the temperature to maintain the appropriate stoichiometry for the reaction; an insufficient supply of $NH_3$ results in inadequate NOx reduction, whilst an excess may cause $NH_3$ to slip past the catalyst Whilst at sufficiently high temperature, the catalyst can selectively oxidise that excess $NH_3$ to $N_2$, at low temperature, the unreacted $NH_3$ will be emitted as such. Even if the proper stoichiometry of $NH_3$ is provided, the catalyst may not be sufficiently active at low temperature to react all the $NH_3$ with the NOx. For example, FIG. 1 shows the reaction of $NH_3$ with NOx over a non-metallised zeolite as a function of temperature at a stoichiometry of 1:1 at an inlet concentration of 200 ppm. It can be seen that at temperatures below 300° C. the reduction does not proceed to any significant extent. Furthermore, it has been reported that the presence of excess $NH_3$ at low temperature could lead to the formation of $NH_4NO_3$ and $(NH_4)_2SO_4$. There is also evidence that the presence of excess gas phase $NH_3$ can inhibit the $NH_3$ SCR reaction over some catalysts at low temperature. Urea is usually the preferred form of storing $NH_3$ on a vehicle. Urea is readily available and is stable in water solution. However, it only hydrolyses readily to $NH_3$ at temperatures greater than 150° C., and may not be a suitable source of $NH_3$ at low temperature. Exhaust gas temperatures, though, vary over an engine cycle and for the average light duty diesel car a significant fraction of that cycle is at low temperature. Thus, the control of NOx at low temperature is a problem.

Methods have been suggested to mitigate this problem. For instance, U.S. Pat. No. 5,785,937, JP-A-07136465 and U.S. Pat. No. 4,963,332 all suggest the use of ammonia as a reductant to convert $NO_x$ to nitrogen over a catalyst EP-A-0773354 also describes the use of ammonia to reduce $NO_x$ to nitrogen. However, ammonia is synthesis in situ over a three-way catalyst during the rich burning phase of the engine and the supply of ammonia is triggered as a function of the stoichiometry of the fuel in terms of the fuel to air ratio not as a function of temperature.

The present invention provides an improved apparatus and method for reducing the content of NOx.

Accordingly, the invention provides an apparatus for reducing the content of nitrogen oxides ($NO_x$) in the exhaust gas of a lean burn engine, which apparatus comprises:

(a) an exhaust capable of allowing exhaust gases to flow therethrough;

(b) a selective catalytic reduction catalyst located in the flow-path of the exhaust gas and being capable of (i) catalysing the reduction of the $NO_x$ by ammonia to nitrogen and (ii) adsorbing and desorbing ammonia during the engine cycle;

(c) means for supplying ammonia from an ammonia source to the catalyst; and (d) switching means for intermittently supplying ammonia during an engine cycle thereby enabling (i) the catalyst to adsorb ammonia when ammonia supply is switched on and (ii) the adsorbed ammonia to react with $NO_x$ when ammonia supply is switched off, characterised in that the catalyst comprises a zeolite and the switching means is triggered on and off at pre-set temperature levels of the catalyst.

The invention provides also a method of reducing the content of nitrogen oxides (NOx) in the exhaust gas of a lean burn engine, which method comprises passing the exhaust gas over a selective catalytic reduction catalyst which catalyses the reduction of the NOx by ammonia to nitrogen and which adsorbs and desorbs ammonia during the engine cycle, ammonia being supplied intermittently to the catalyst during the engine cycle, the catalyst adsorbing ammonia during its supply and the ammonia which has been adsorbed reacting with the NOx when the ammonia is not supplied.

We have discovered that ammonia can be absorbed on a SCR catalyst and thereafter used in the NOx reduction when ammonia is not being supplied. It is an advantage to be able to achieve the NOx reduction while supplying the ammonia intermittently. In particular, the ammonia supply can be halted and yet NOx reduction occur when the temperature of the catalyst is low and supply would have the problems referred to above. The stored ammonia can be used as reductant for NOx over the same catalyst without the presence of gas phase $NH_3$.

The ammonia can be supplied without the exhaust gas so that the catalyst adsorbs the ammonia and then the exhaust gas passed over the catalyst for the NOx reduction to occur Preferably, however, the exhaust gas is passed continuously over the catalyst.

Figure 2:
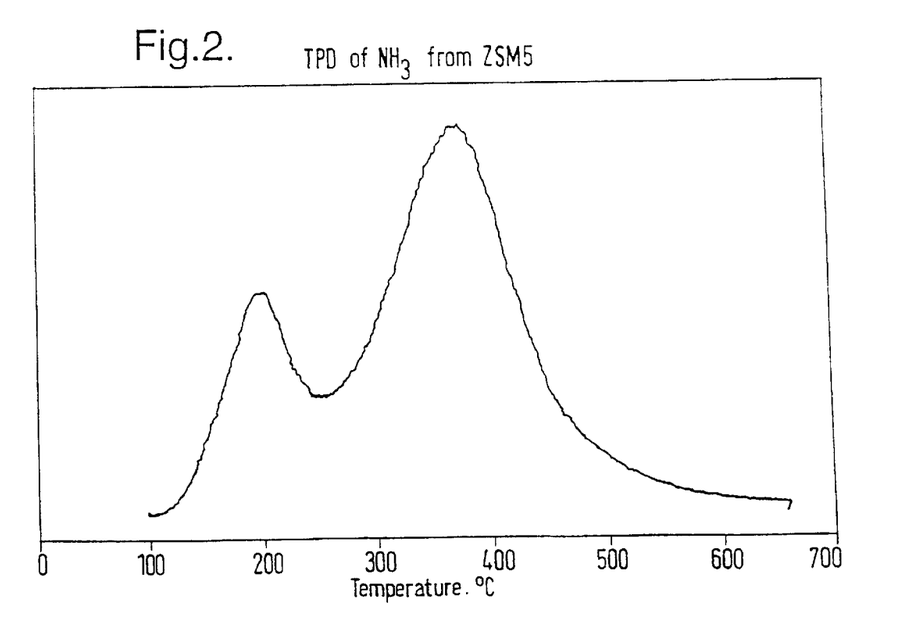
FIG. 2 shows the temperature programmed desorption (TPD) of $NH_3$ from ZSM5 which had been pre-adsorbed at 100° C., the graph showing, in arbitrary units, the concentration of ammonia in the gas against temperature.
Figure 3:
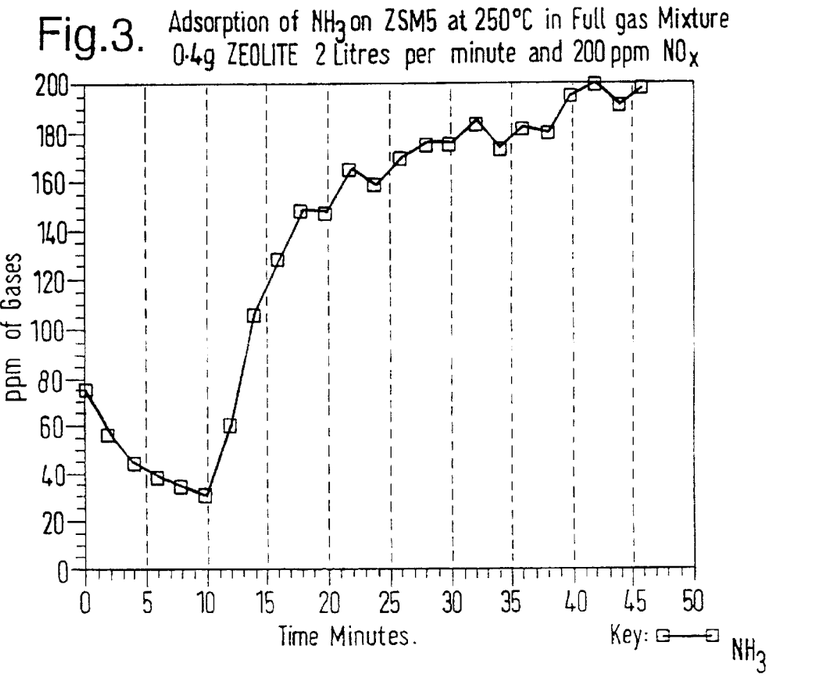
FIG. 3 shows the $NH_3$ concentration in a full simulated exhaust gas mixture containing 4.5% $CO_2$, 12% $O_2$, 4.5% $H_2O$, 200 ppm CO, 100 ppm $C_3H_6$, 20 ppm $SO_2$ and 200 ppm $NH_3$ with the balance $N_2$ after passage over ZSM5 at 250° C. against time, and hence shows the $NH_3$ uptake by the zeolite.
Figure 4:
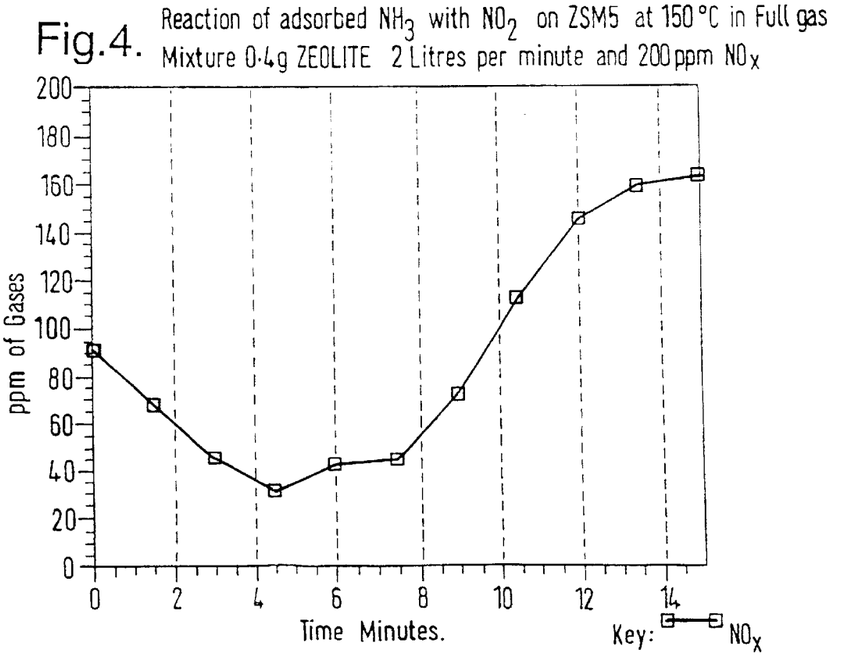
FIG. 4 shows the NOx concentration remaining in simulated exhaust gas after passage over the zeolite containing adsorbed $NH_3$ resulting from the adsorption shown in FIG. 3 against time.

The invention uses adsorption and desorption characteristics of the required catalyst. A higher amount of $NH_3$ will be adsorbed, and hence be available for subsequent reaction, if adsorption is at a lower temperature at which the catalyst adsorbs less $NH_3$. Preferably $NH_3$ is adsorbed at a temperature at which a large amount is adsorbed; the temperature is preferably below that of maximum desorption. The temperature, however, is preferably above that at which any significant formation of ammonium salts occurs. FIG. 2 shows the desorption profile from zeolite ZSM5 (non-metallised) of $NH_3$ which had been pre-adsorbed at 100° C. It can be seen that at say 300° C. more $NH_3$ is retained, adsorbed, than at say 400° C., and that the temperature of maximum desorption is about 370° C. Bearing in mind that the desorption of $NH_3$ is endothermic, it can also be seen that if $NH_3$ were adsorbed at say 300° C. and then heated, $NH_3$ would be desorbed in accordance with the graph so that less would be available for subsequent reaction, while if $NH_3$ were adsorbed at the same temperature, 300° C., and cooled, $NH_3$ would not be desorbed so the adsorbed $NH_3$ would be available for subsequent reaction. $NH_3$ stored on the ZSM5 catalyst at 250° C. can effectively be used to reduce NOx at a temperature as low as 150° C. under exhaust conditions simulating those of a light duty diesel car. FIG. 3 shows the $NH_3$ uptake of ZSM5 catalyst (non-metallised) from a gas mixture containing 4.5% $CO_2$, 12% $O_2$, 4.5% $H_2O$, 200 ppm CO, 100 ppm $C_3H_6$, 20 ppm $SO_2$ and 200 ppm $NH_3$ with the balance $N_2$ at 250° C., and FIG. 4 shows the subsequent reaction of that adsorbed $NH_3$ with NOx at 150° C. It can be seen that significant amounts of NOx are reduced by the adsorbed $NH_3$ over a period of time and that as the stored $NH_3$ is being consumed, the reduction reaction declines with time. When the temperature rises in the engine cycle, however, $NH_3$ can be applied again, and hence adsorbed $NH_3$ replenished. Accordingly, the problem of applying $NH_3$ at low temperature can be overcome by halting its supply and using adsorbed $NH_3$. The amount of $NH_3$ adsorbed on a fixed weight of catalyst can be increased by including its partial pressure in the gas mixture. For example, Table 1 gives the amount of $NH_3$ adsorbed by a zeolite at 250° C. from a simulated gas mixture of differing $NH_3$ concentrations.

TABLE 1

$NH_3$ Adsorption as a Function of $NH_3$ Concentration

| $NH_3$ Concentration (ppm) | Amount $NH_3$ Adsorbed (mmoles per g) |
|---|---|
| 200 | 0.63 |
| 500 | 1.22 |
| 1000 | 1.48 |

The means to make the supply of ammonia intermittent during the engine cycle in the present apparatus can be a switch which switches the ammonia supply on and off dependent on the level of NOx conversion occurring over the SCR catalyst. Preferably, however, the means to make the supply of ammonia intermittent comprises a switch to switch on the means to supply the ammonia when the temperature of the catalyst rises above a set level (i) during the engine cycle, and to switch off the means to supply the ammonia when the temperature of the catalyst falls below a set level (ii). The set level (i) is preferably in the range 250–400° C., especially in the range 250–350° C. The set level (ii) is preferably in the range 200–250° C.

The ammonia can be supplied for instance 1–30 times per minute.

The source of ammonia and means to supply it from the source to the catalyst can be conventional. Compounds of ammonia as a solid or a solution in water are preferred. The compounds are preferably urea or ammonium carbamate. The means to supply the ammonia from the source to the catalyst can be a pipe through which it is injected into the exhaust gas up-stream of the catalyst. Thus, the present invention can be employed to provide a method of promoting the conversion of NOx under oxidising conditions in an exhaust fitted with a means of injecting $NH_3$ and a catalyst which adsorbs $NH_3$ during parts of the engine cycle in which the exhaust gas is sufficiently warmed for the hydrolysis of $NH_3$ precursor and injection of ammonia and ammonia is adsorbed by the catalyst for use as reductant for NOx during parts of the engine cycle in which the exhaust gas is cooler, without the need for the continuous injection of $NH_3$ into the exhaust gas.

It can be seen that the invention provides an exhaust system for an engine operating generally under lean conditions, which exhibits a higher exhaust gas temperature and a lower exhaust gas temperature, the lower exhaust gas temperature being inadequate for the effective hydrolysis of $NH_3$ precursor and injection of $NH_3$ (generally a temperature below 200° C.), and an $NH_3$ SCR catalyst arranged and constructed so that during the higher exhaust gas temperature parts of the engine cycle the catalyst adsorbs $NH_3$ and during the lower exhaust gas temperature parts of the engine cycle the adsorbed $NH_3$ is used as reductant for NOx.

The catalyst can be any which has the required characteristics of the present catalyst. The same material can both selectively catalyse the reduction and also adsorb and desorb the ammonia, and this is preferred. However, different materials in the catalyst can perform the two functions, one material catalysing and one material adsorbing and desorbing. When different materials are employed, they can be physically separate or, preferably, in admixture one with another. A zeolite can perform both functions or a zeolite can be employed which performs one function together with a different material, which may or may not be a zeolite, which performs the other function. The catalyst preferably comprises a zeolite. The zeolite can be metallised or non-metallised, and can have various silica-to-alumina ratios. Examples are metallised or non-metallised ZSM5, mordenite, γ zeolite and β zeolite. Preferred is ZSM5 or ion-exchanged or metal impregnated ZSM5 such as Cu/ZSM5. It may be desirable that the zeolite contains metal, especially Cu, Ce, Fe or Pt; this can improve the low temperature SCR activity. The zeolite can contain for instance 1–10% of metal by weight. The catalyst should have an appropriate structure, for instance in terms of pore size or surface acid sites, to trap and release $NH_3$.

The catalyst is preferably carried out on a support substrate, in particular a honeycomb monolith of the flow-through type. The monolith can be metal or ceramic. The substrate can be conventional.

Nitrogen oxide (NO) is usually the most abundant nitrogen oxide in an engine exhaust stream, but at lower temperatures the reaction of the adsorbed $NH_3$ on a zeolite catalyst occurs more readily with $NO_2$ than with NO. Accordingly it is often desirably to oxidise NO to $NO_2$ up-stream of the SCR catalyst, particularly at low temperature.

The present engine can b a diesel or petrol (gasoline) engine. The diesel engine can be a light duty or heavy duty diesel engine. The engine is preferably that of a vehicle.

The invention is illustrated by the accompanying drawings, which are graphs in which:

FIGS. 1–4 are discussed further hereinbefore, and FIGS. 5–15 hereinafter.

The invention is illustrated also by the following Examples.

EXAMPLE 1

Reaction of NO With Pre-adsorbed $NH_3$ Over Non-metallised ZSM5

Figure 5:
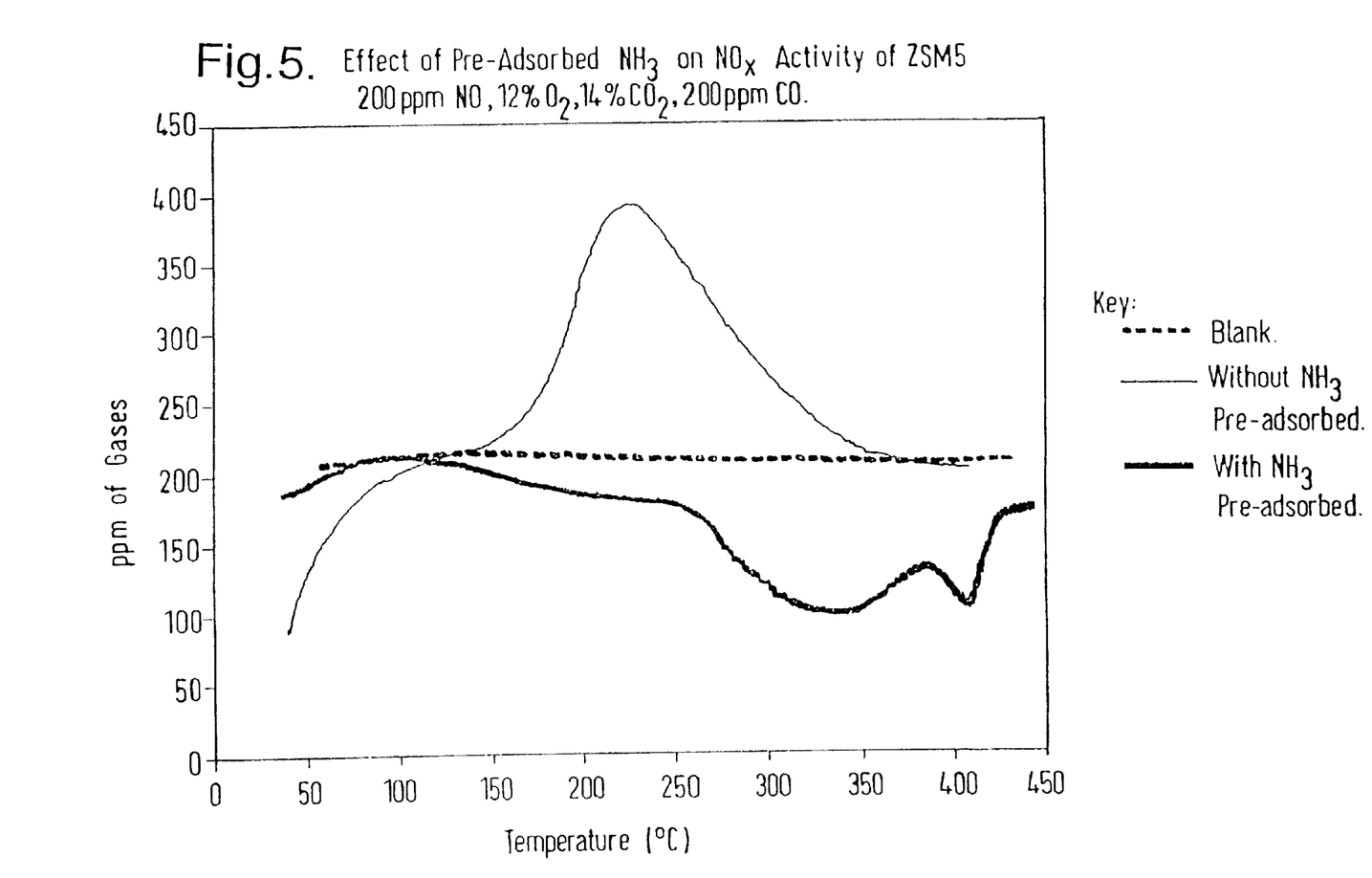
FIG. 5 shows the NOx concentration remaining in simulated exhaust gas containing 200 ppm NO, 200 ppm CO, 12% $O_2$ and 14% $CO_2$ with the balance $N_2$ after passage over ZSM5 with and without pre-adsorption of $NH_3$ against temperature.
Figure 6:
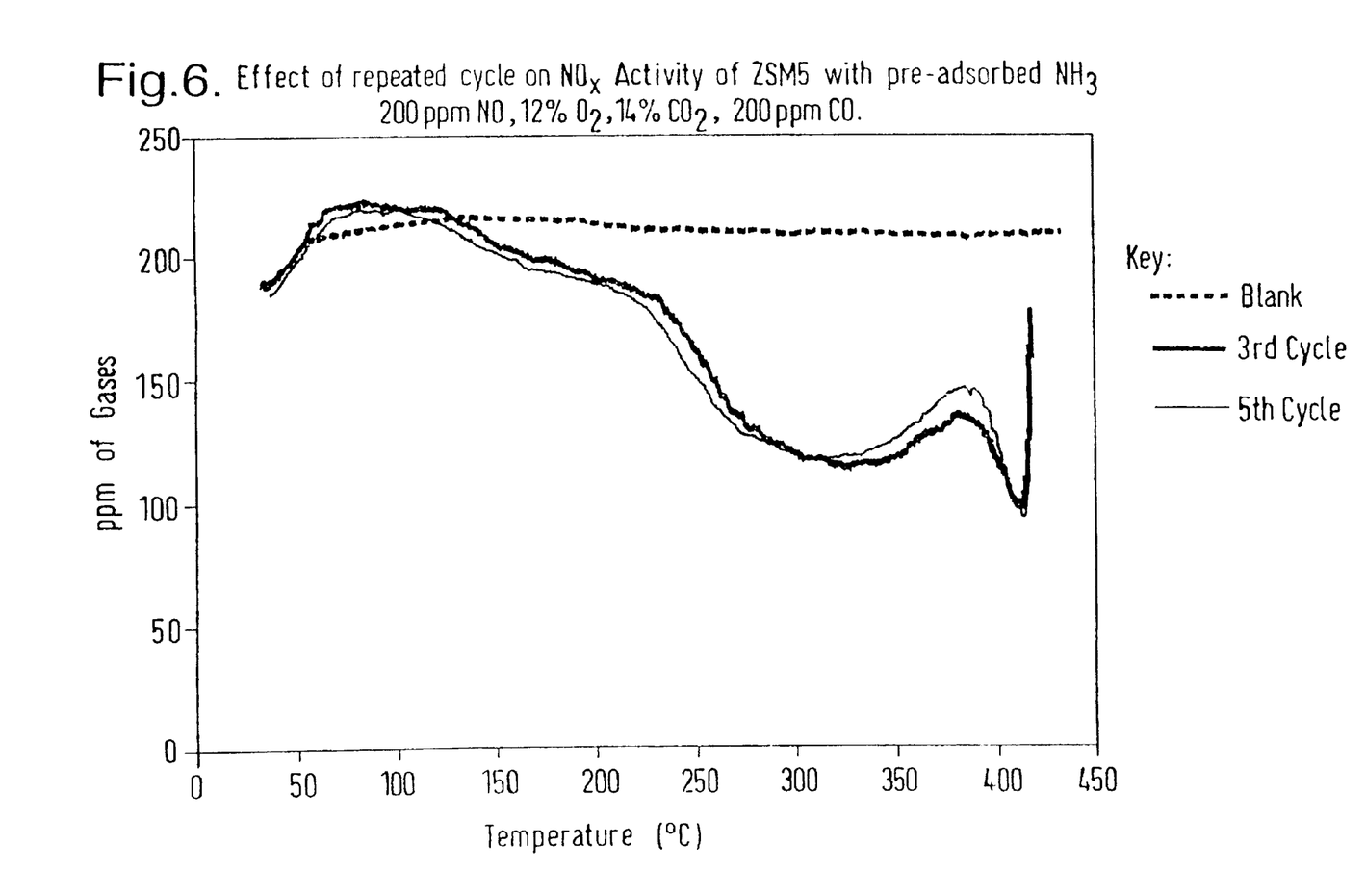
FIG. 6 shows the corresponding effect to that shown in FIG. 5 of successive cycles of the $NH_3$ pre-adsorption followed by subjection to the simulated exhaust gas.

This Example shows the effect of pre-adsorbing $NH_3$ at 250° C. on the conversion of NOx over a non-metallised zeolite in a simple gas mixture containing NOx, CO, $CO_2$ and $O_2$ during a light-off test from room temperature to 400° C. The gas stream containing NO (200 ppm), CO (200 ppm), $O_2$ (12%), $CO_2$ (14%) with the balance $N_2$ at a flow rate of 2 liters per minute was first passed over the non-metallised zeolite (0.4 g) from room temperature to 400° C. at a heating rate of 50° C. per minute and the NOx at the outlet measured. In a subsequent experiment, the catalyst temperature was first raised to 250° C. and 200 ppm $NH_3$ was added to the gas stream, the zeolite was exposed to that stream for 5 minutes and then the $NH_3$ switched off, and the catalyst was cooled to room temperature and the rapid light-off repeated. FIG. 5 shows the outlet NOx concentration for these experiments. It can be seen that in the case where $NH_3$ was not pre-adsorbed over the catalyst, some of the NOx is adsorbed on the zeolite at low temperature and is then subsequently released between 150° C. and 350° C., but that when $NH_3$ was pre-adsorbed on the zeolite, the zeolite did not adsorb a significant amount of NOx at low temperature. Furthermore, it can be seen that a decrease in the outlet NOx concentration occurs from 150° C. to 450° C. due to the reaction of the NOx with the pre-adsorbed $NH_3$. This effect of reacting the adsorbed $NH_3$ with the NOx can be repeated over successive cycles with $NH_3$ injection at 250° C. between each cycle, as is shown in FIG. 6.

Figure 7:
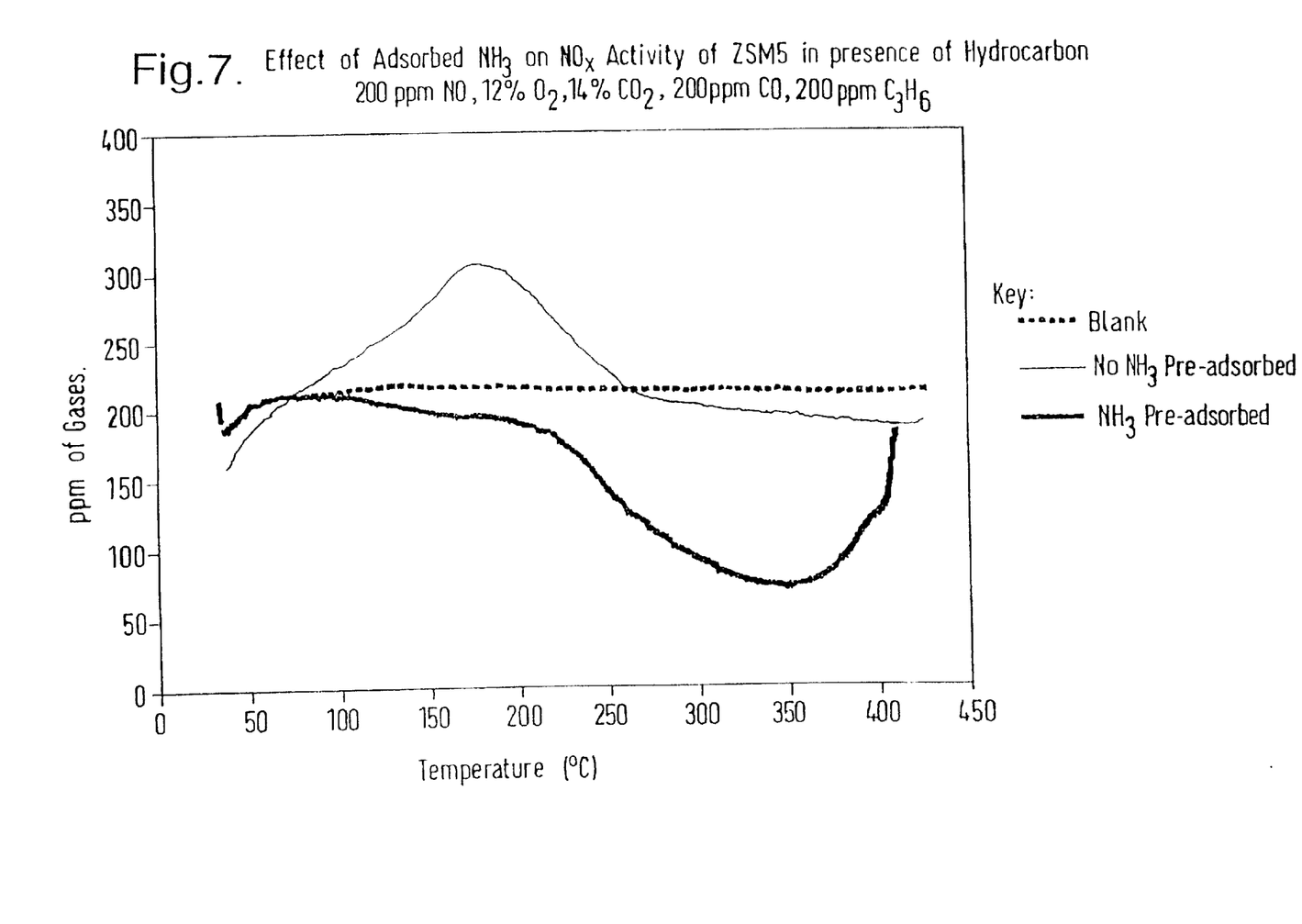
FIG. 7 corresponds to FIG. 5 but with the simulated exhaust gas containing also hydrocarbon.
Figure 8:
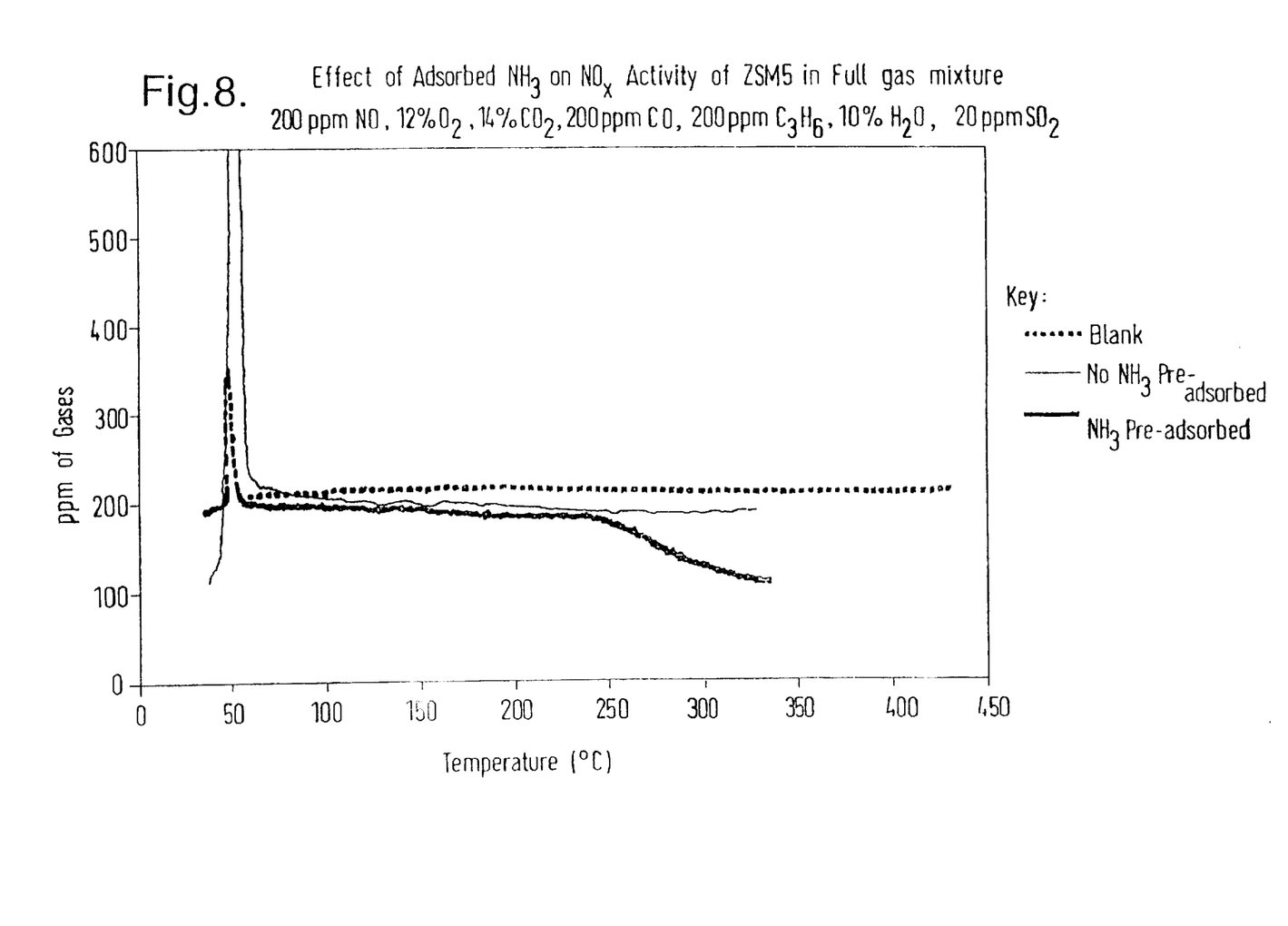
FIG. 8 corresponds to FIG. 7 but with the simulated exhaust gas containing also $H_2O$ and $SO_2$.

We have also shown that even in the presence of other gaseous components such as hydrocarbon, $H_2O$ and $SO_2$, the adsorption of $NH_3$ will readily occur on the zeolite and can be used to reduce NOx. For example, FIG. 7 shows the effect of adding 200 ppm $C_3H_6$ to the gas mixture in similar tests to those described above and FIG. 8 shows the effect of further addition of $H_2O$ (10%) and $SO_2$ (20 ppm). It can be seen that in both cases NOx was reduced by the adsorbed $NH_3$.

EXAMPLE 2

Reaction of $NO_2$ With Pre-adsorbed $NH_3$ Over Non-metallised ZSM5

Figure 9:
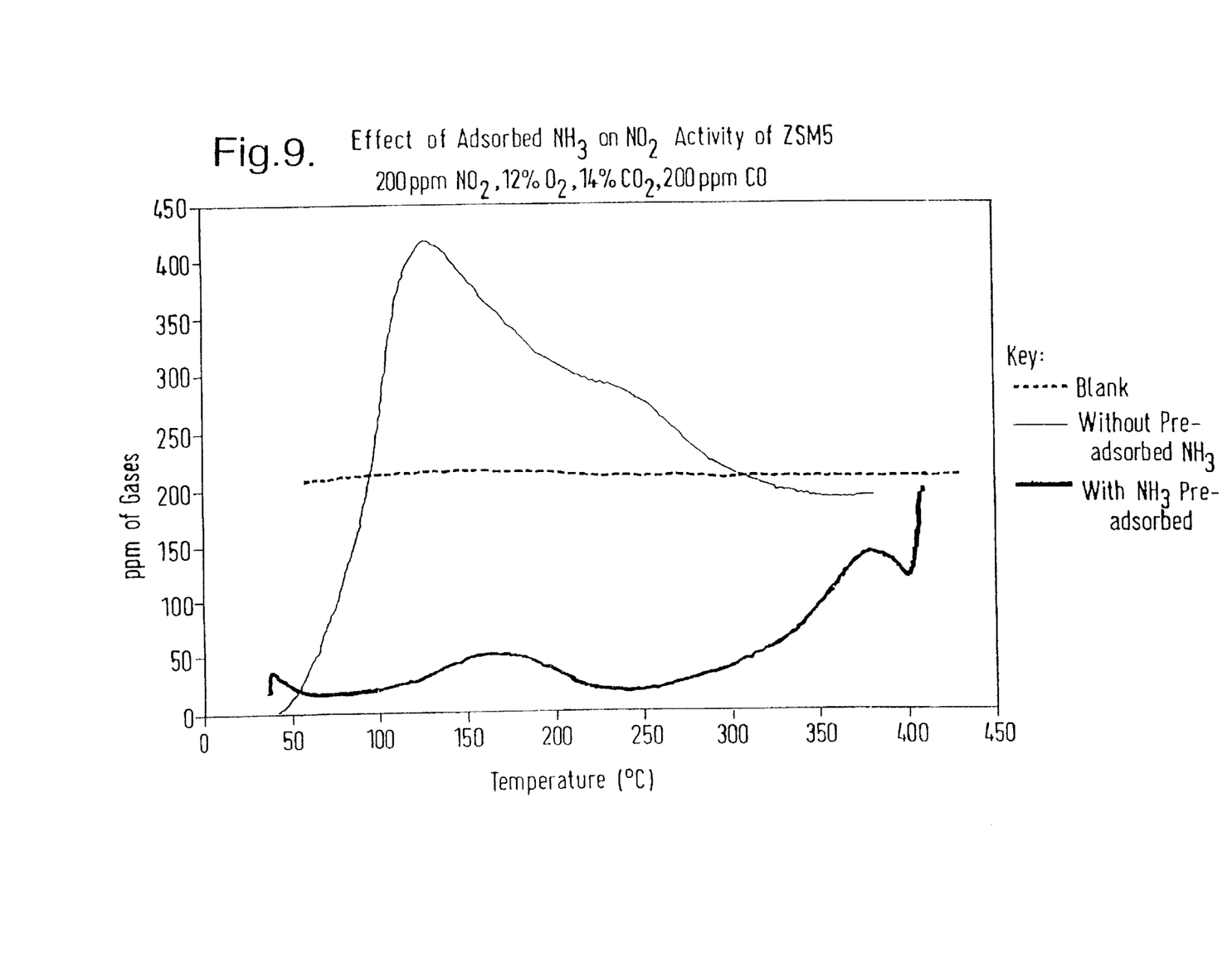
FIG. 9 corresponds to FIG. 5 but with the simulated exhaust gas containing $NO_2$ instead of NO.

The selective catalytic reduction of NOx by $NH_3$ under oxidising conditions proceeds more rapidly at low temperature if $NO_2$ instead of NO is present. The present Example shows that $NH_3$ pre-adsorbed on a zeolite catalyst can be used to reduce $NO_2$ even at a temperature as low as 100° C. This was demonstrated by rapid light-off tests analogous to that described above in Example 1. In the first experiment, a simple gas mixture containing $NO_2$ (200 ppm), CO (200 ppm), $O_2$ (12%), $CO_2$ (14%) with the balance $N_2$ at a flow rate of 2 liters per minute was passed over the non-metallised zeolite (0.4 g) from room temperature to 400° C. at a heating rate of 50° C. per minute. In a subsequent experiment, the catalyst temperature was first raised to 250° C. and 200 ppm $NH_3$ was added to the gas stream, the zeolite was exposed to that stream for 5 minutes and then the $NH_3$ was switched off, and the catalyst was cooled to room temperature and the rapid light-off repeated. FIG. 9 shows the outlet NOx concentration from these experiments. It can be seen that in the absence of pre-adsorbed $NH_3$, $NO_2$ is adsorbed at low temperature over the zeolite and is released between 100° C. and 300° C., but when $NH_3$ was pre-adsorbed on the catalyst, significant NOx reduction is shown over the entire temperature window up to 400° C.

Figure 10:
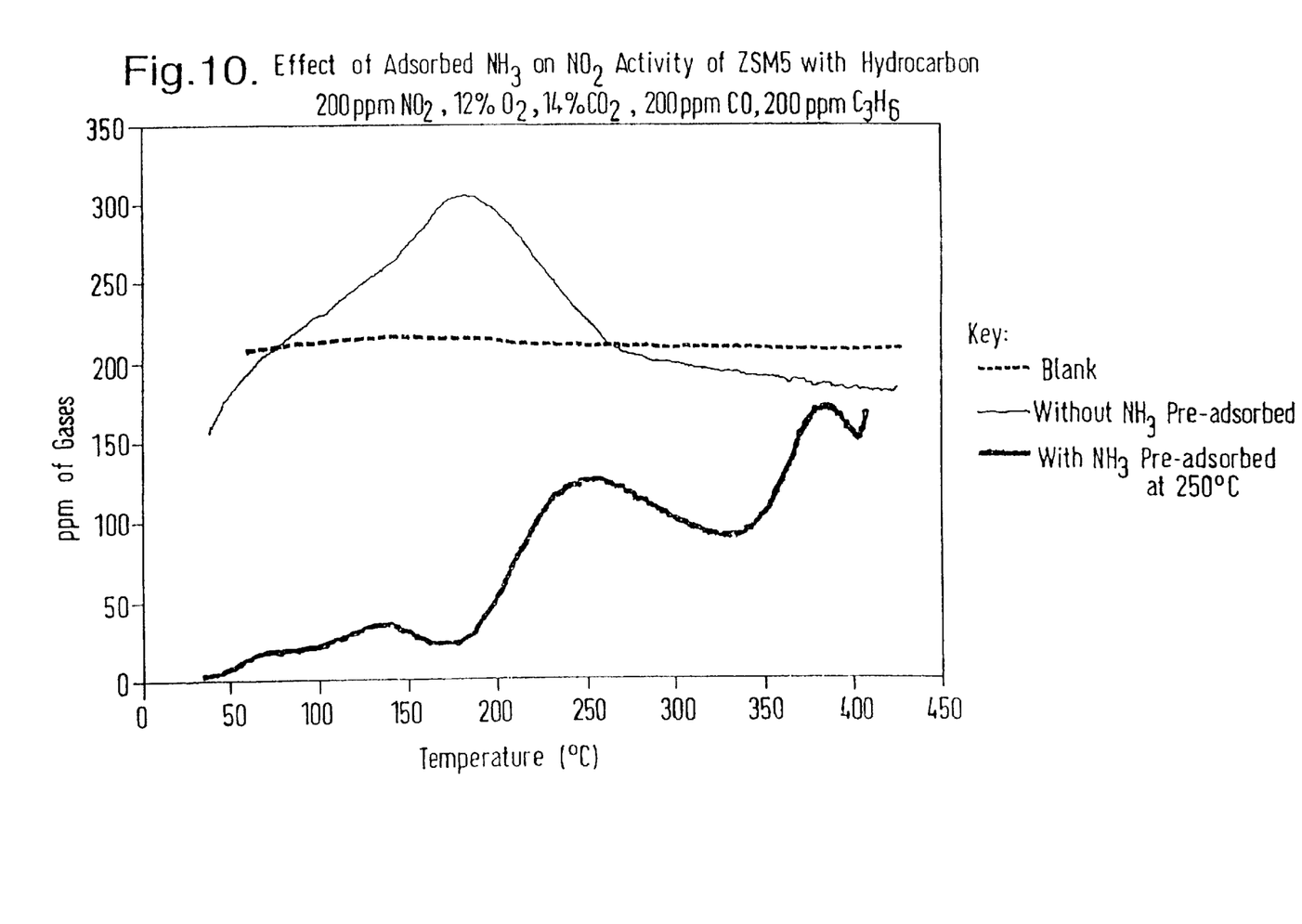
FIG. 10 corresponds to FIG. 9 but with the simulated exhaust gas containing also hydrocarbon.
Figure 11:
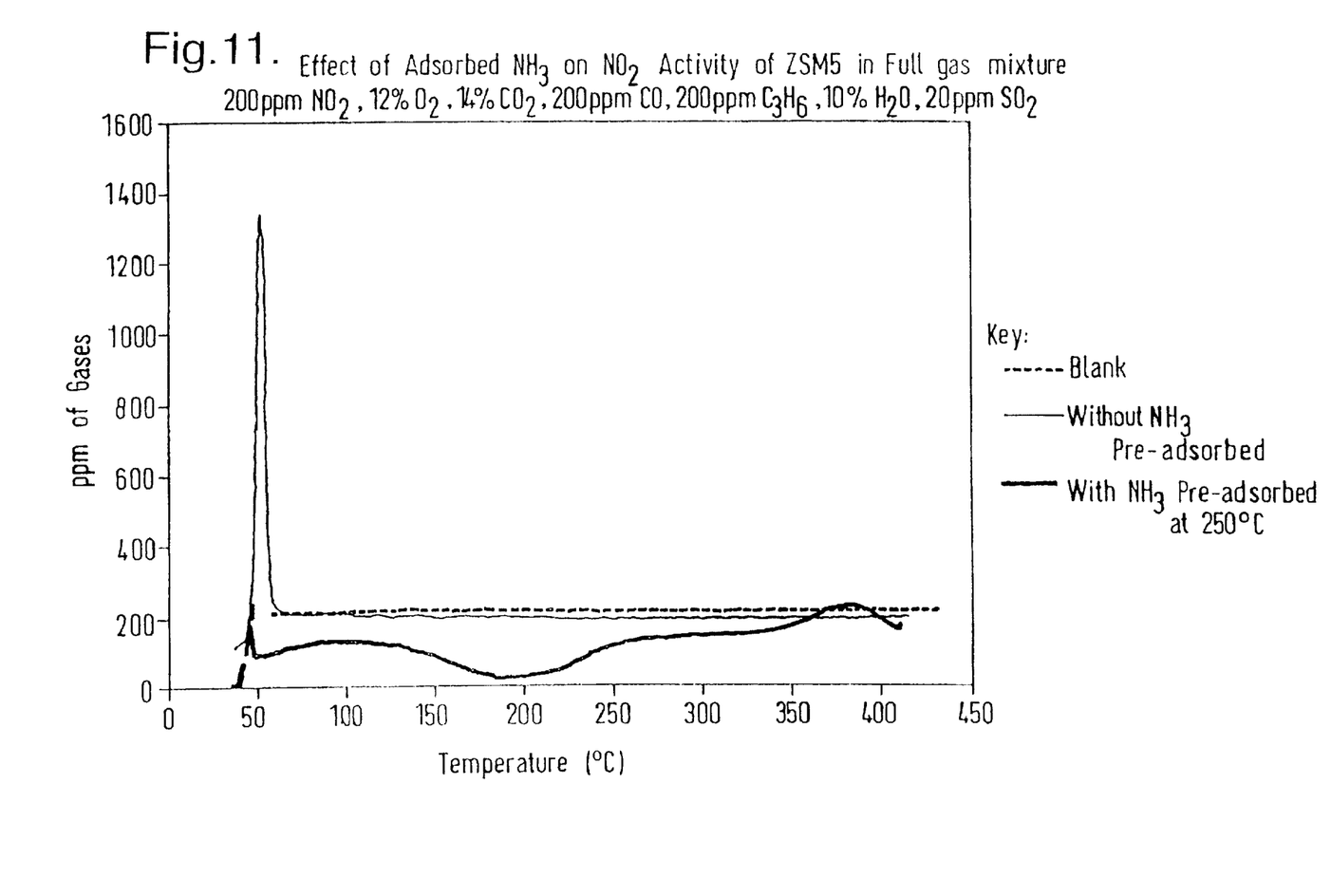
FIG. 11 corresponds to FIG. 10 but with the simulated exhaust gas containing also $H_2O$ and $SO_2$.

We have also shown that even in the presence of hydrocarbon, $H_2O$ and $SO_2$ adsorbed $NH_3$ will readily react with $NO_2$. FIG. 10 shows the effect of adding $C_3H_6$ on the reaction of pre-adsorbed $NH_3$ with NOx, and FIG. 11 demonstrates the effect with addition of $H_2O$ and $SO_2$.

EXAMPLE 3

Figure 12:
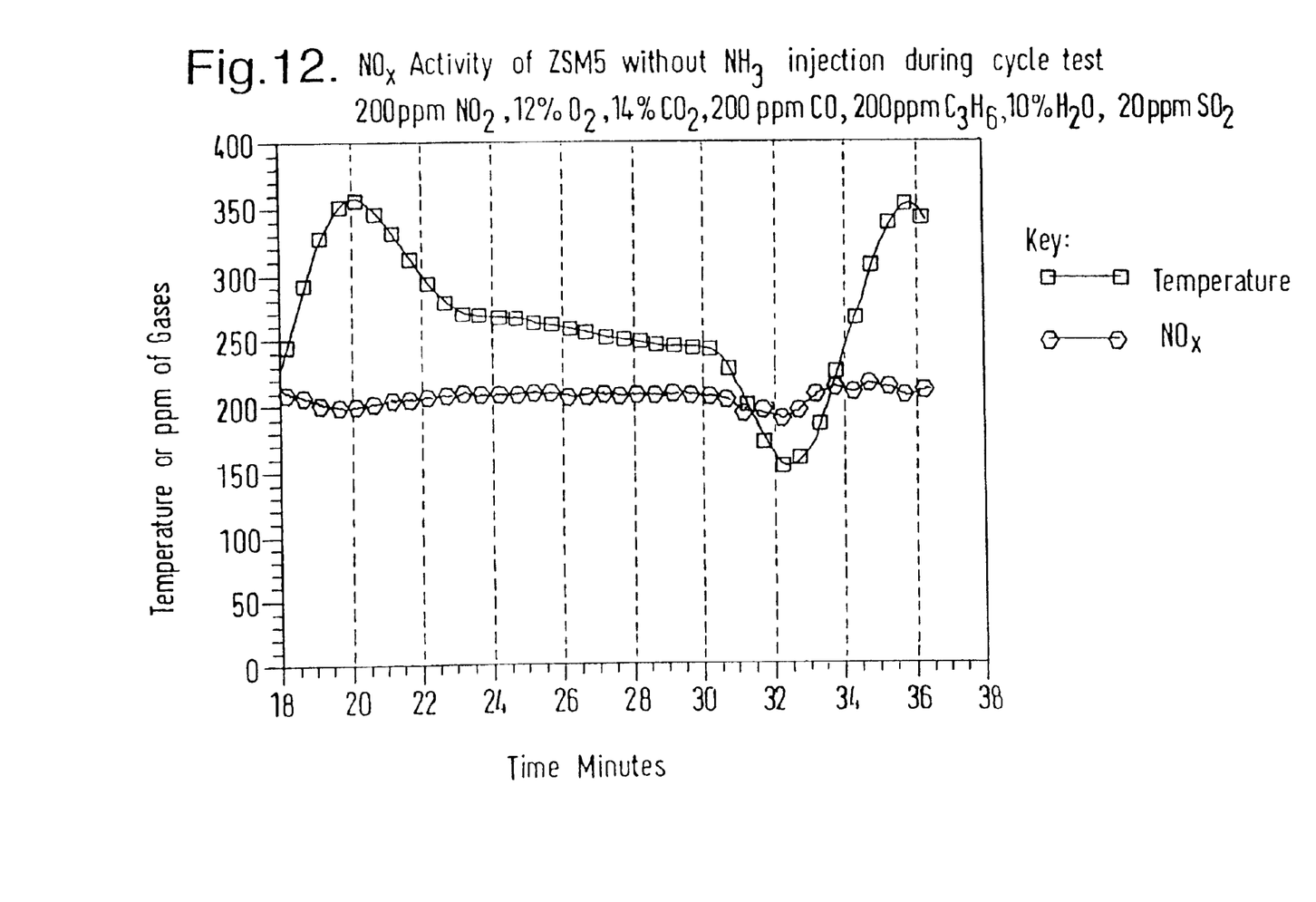
FIG. 12 shows NOx concentration and temperature against time during part of an engine cycle.
Figure 13:
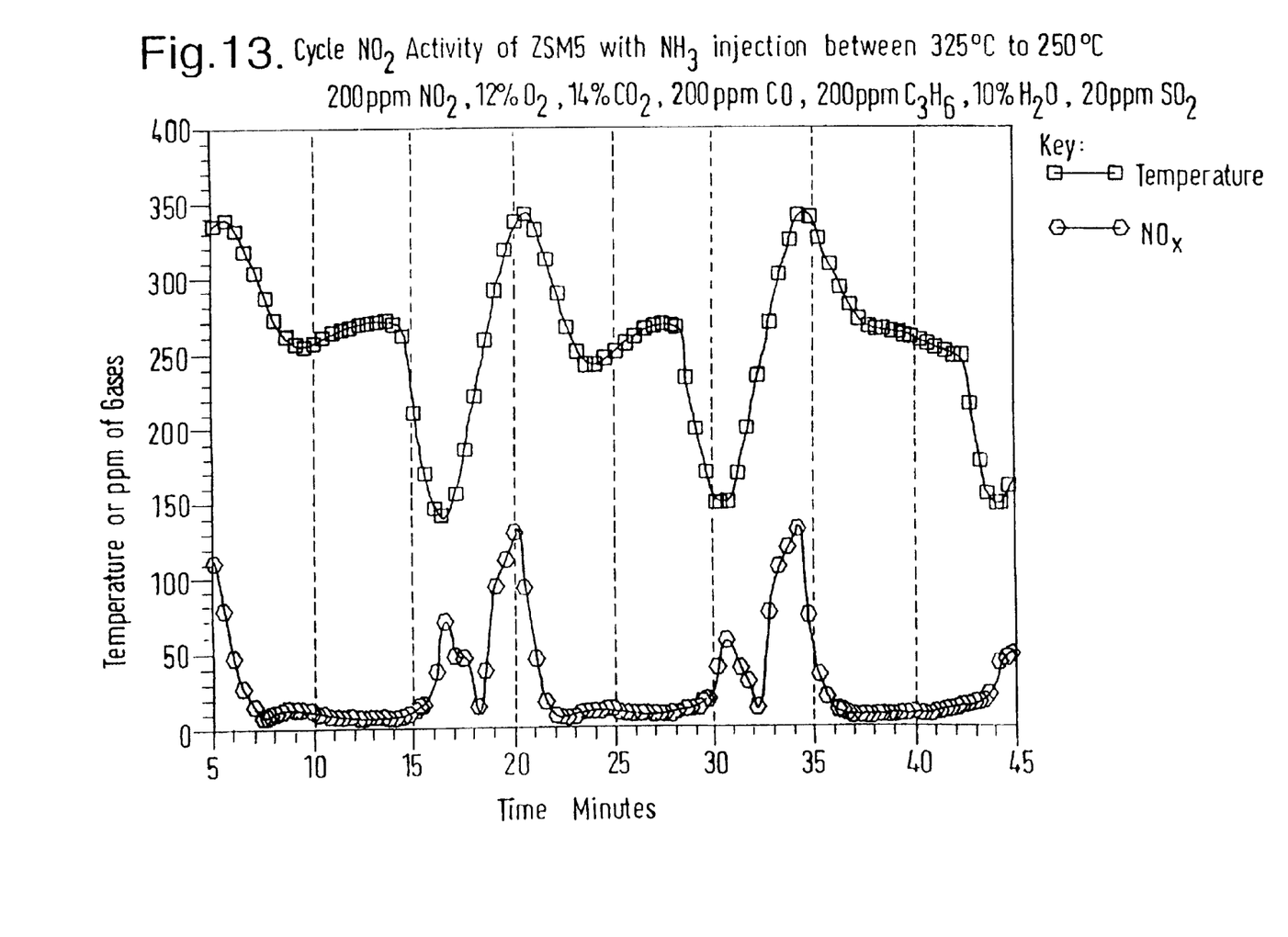
FIG. 13 corresponds to FIG. 12 but shows the effect of intermittent supply of $NH_3$.

Reaction of $NO_2$ With Pre-adsorbed $NH_3$ Over Non-metallised ZSM5 in Cycle Test In most cases, exhaust gas temperature varies during an engine cycle and for a significant fraction of that time the temperature can be low. We have shown that by injecting $NH_3$ over a set temperature during the cycle, the adsorbed $NH_3$ can subsequently be utilised in reducing NOx at both low and high temperature. In the experiment, exhaust gas containing CO$_2$ (14%), O$_2$ (12%), H$_2$O (10%), CO (200 ppm), C$_3$H$_6$ (200 ppm), SO$_2$ (20 ppm) and NO$_2$ (200 ppm) was cycled between 150° C. and 350° C. with a dwell of approximately 5 minutes at 250° C. during the cooling-down part of the cycle. The NH$_3$ injection was switched on when the temperature was at 350° C. and switched off when the temperature fell to 250° C. FIG. 12 shows the outlet NOx concentration and the temperature against time without any NH$_3$ injection, and FIG. 13 shows the effect of the cycling with the intermittent injection of NH$_3$. In both Figures, the ordinate scale gives the degrees C for the temperature graph and the parts per million (ppm) for the NOx graph.

EXAMPLE 4

Reaction of NO With Pre-adsorbed NH$_3$ Over Cu/ZSM5

Figure 14:
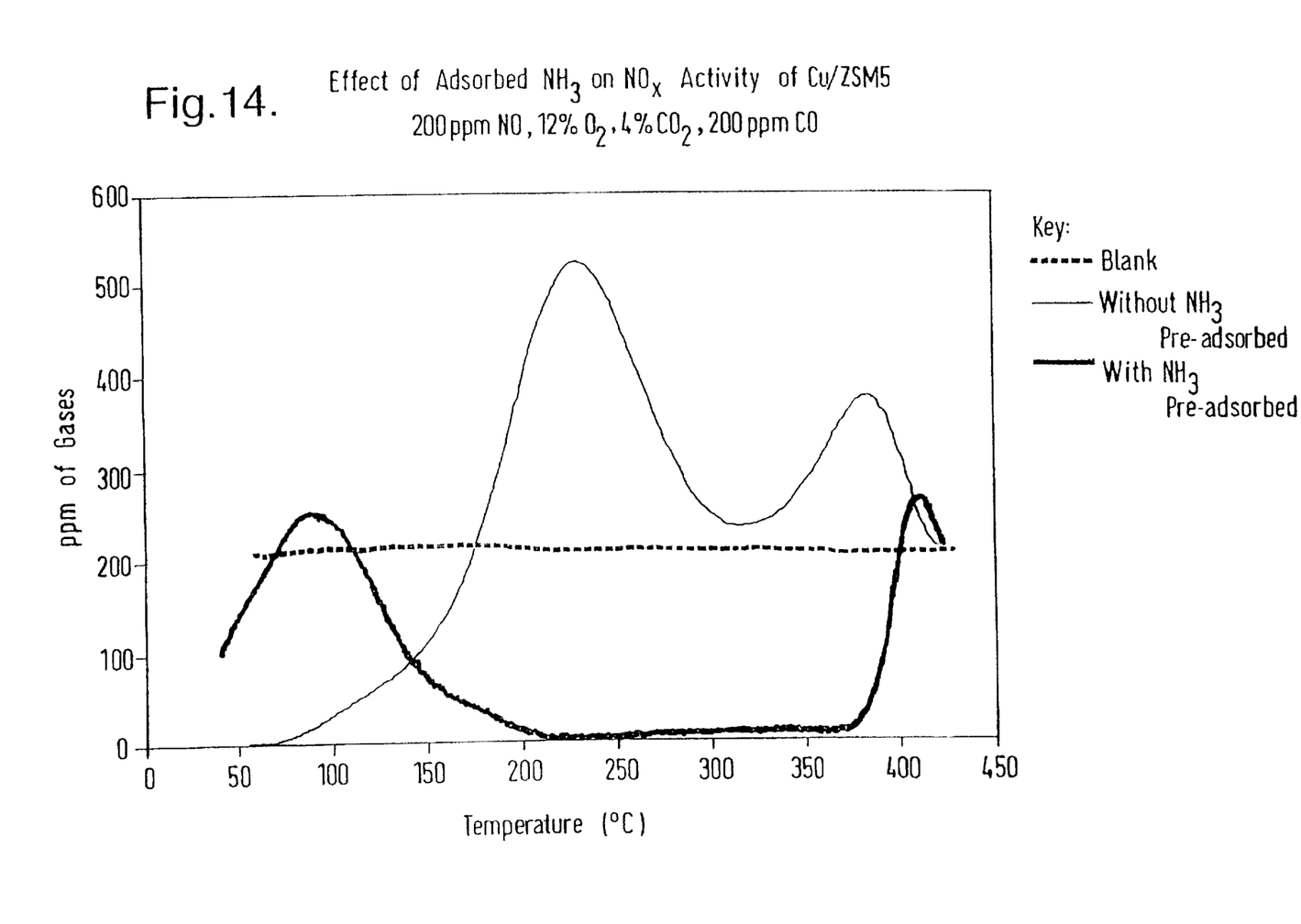
FIG. 14 shows the NOx concentration remaining in simulated exhaust gas after passage over Cu/ZSM5 with and without pre-adsorption of $NH_3$ against temperature.

This Example shows the effect of pre-adsorbing NH$_3$ at 250° C. on the conversion of NOx over a Cu-impregnated ZSM5 (containing 5% copper by weight) in a simple gas mixture containing NOx, CO, CO$_2$ and O$_2$ during a light-off test from room temperature to 400° C. The gas stream containing NO (200 ppm), CO (200 ppm), O$_2$ (12%), CO$_2$ (14%) with the balance N$_2$ at a flow rate of 2 liters per minute was first passed over the Cu/ZSM5 (0.4 g) from room temperature to 400° C. at a heating rate of 50° C. per minute and the NOx at the outlet measured. In a subsequent experiment, the catalyst temperature was first raised to 250° C. and 200 ppm NH$_3$ was added to the gas stream, the Cu/ZSM5 was exposed to that stream for 5 minutes and then the NH$_3$ was switched off, the catalyst was cooled to room temperature rapidly and the light-off repeated. FIG. 14 shows the outlet NOx concentration for these experiments. It can be seen that in the case where NH$_3$ was not pre-adsorbed on the catalyst, some of the NOx is adsorbed on the zeolite at low temperature, and is then subsequently released at higher temperature, but the pre-adsorption of NH$_3$ at 250° C. suppresses the amount of NOx adsorbed at low temperature, with significant NOx reduction by the pre-adsorbed NH$_3$ at temperatures greater than 125° C.

Figure 15:
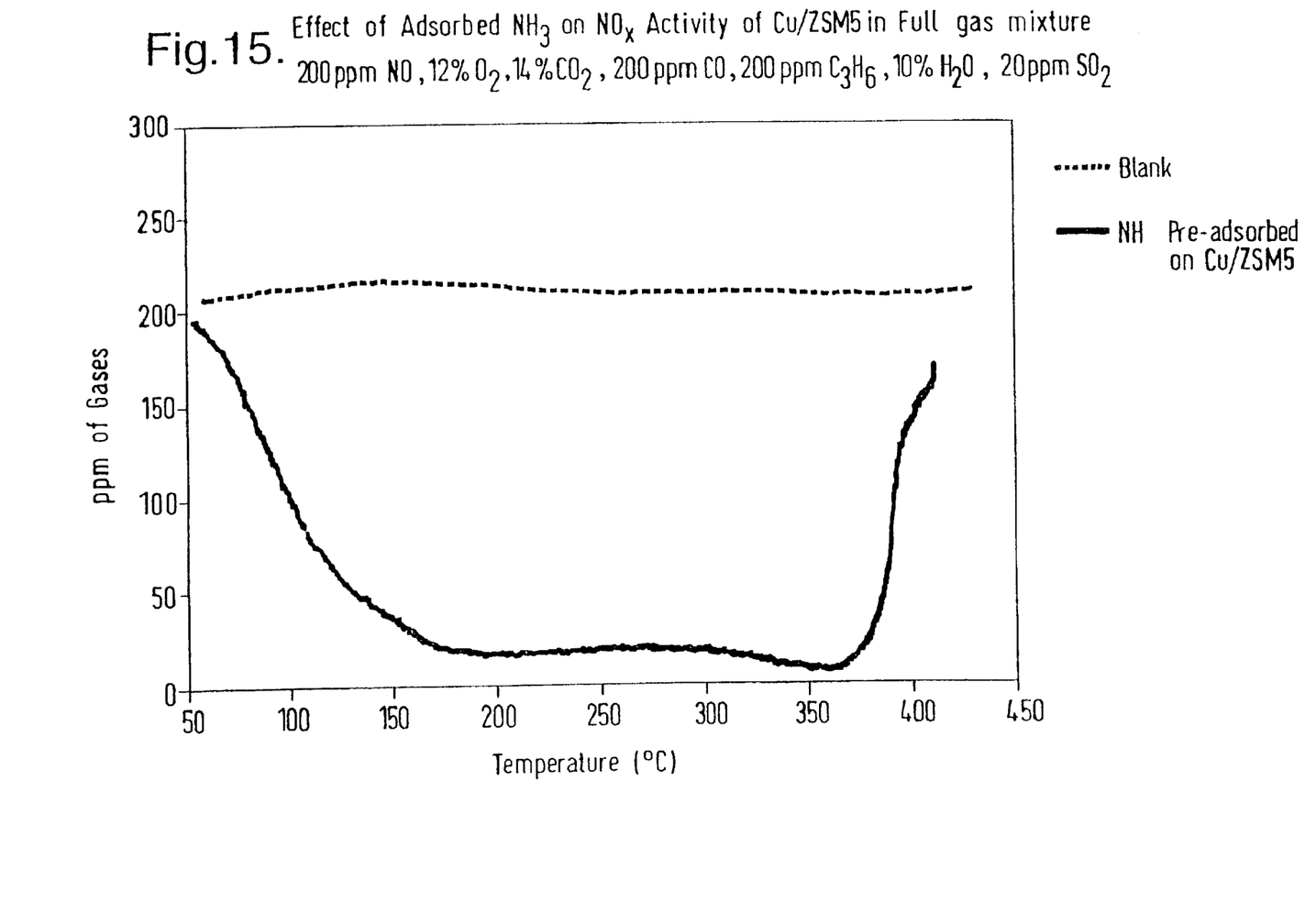
FIG. 15 shows the NOx concentration remaining in simulated exhaust gas which is that used in relation to FIG. 14 but containing also hydrocarbon, $H_2O$ and $SO_2$, after passage over Cu/ZSM5 with pre-adsorption of $NH_3$ against temperature.

Similarly, even in the presence of other gaseous components such as hydrocarbon, H$_2$O and SO$_2$ the adsorption of NH$_3$ will occur readily over the Cu/ZSM5 and can be used to reduce NOx. For example, FIG. 15 shows the effect of pre-adsorbing NH$_3$ on the Cu/ZSM5 at 250° C. from a gas mixture containing NO, H$_2$O, CO$_2$, CO, C$_3$H$_6$, SO$_2$ and O$_2$ and the reduction of NOx by the adsorbed NH$_3$ during a light-off test.

What is claimed is:

1. A method of reducing the content of nitrogen oxides (NOx) in the exhaust gas of a diesel engine operating in a substantially continuously lean burn mode, which method comprises:
    passing the exhaust gases over a selective catalytic reduction catalyst comprising zeolite which both releasably adsorbs ammonia and catalyses the reduction of NOx to nitrogen by ammonia during an engine cycle;
    supplying ammonia to the catalyst during the engine cycle from a source of ammonia, when the catalyst temperature is above a first pre-determined temperature;
    adsorbing ammonia to the catalyst during ammonia supply;
    discontinuing the ammonia supply when the catalyst is below a second pre-determined temperature; and
    reacting ammonia absorbed on the catalyst with NOx when the catalyst is below a second pre-determined temperature.

2. A method according to claim 1 wherein the zeolite is ZSM-5.

3. A method according to claim 1 wherein the zeolite catalyst is non-metallised.

4. A method according to claim 1 wherein the zeolite contains a metal.

5. A method according to claim 4 wherein the metal is selected from the group consisting of copper, iron, cerium and platinum.

6. A method according to claim 1 wherein the metal is Cu/ZSM-5.

7. A method according to claim 1 wherein the first pre-determined temperature is in the range of about 250–400° C. and the second pre-determined level is in the range of about 200–250° C.

8. An apparatus for reducing the content of nitrogen oxides (NOx) in the exhaust gas of a diesel engine operating in a substantially continuously lean burn mode comprising:
    (a) an exhaust apparatus capable of allowing exhaust gas to flow therethrough;
    (b) a selective catalytic reduction catalyst comprising zeolite located in the flow-path of the exhaust gas and being capable of both catalyzing the reduction of NOx in the exhaust gas to nitrogen and releasably adsorbing ammonia during the engine cycle;
    (c) means for supplying ammonia from an ammonia source to the catalyst; and
    (d) switching means for controlling the supply of ammonia during an engine cycle such that ammonia supply is switched on when the catalyst temperature rises above a first pre-determined temperature at which ammonia is adsorbed on the catalyst and the ammonia supply is switched off when the catalyst temperature falls below a second pre-determined temperature, whereby adsorbed ammonia is available to react with NOx when the catalyst is below the first pre-determined temperature.

9. An apparatus according to claim 8, wherein the first pre-determined temperature is in the range of about 250–400° C. and the second pre-determined temperature is in the range of about 200–250° C.

10. An apparatus according to claim 8 wherein the zeolite catalyst is ZSM-5.

11. An apparatus according claim 8 wherein the zeolite catalyst is non-metallised.

12. An apparatus according to claim 8 wherein the zeolite contains a metal.

13. An apparatus according to claim 12 wherein the metal is selected from the group consisting of copper, iron, cerium and platinum.

14. An apparatus of claim 12 wherein the metal is Cu/ZSM-5.

* * * * *